R. A. HADFIELD.
TRAMWAY POINT.
APPLICATION FILED MAR. 21, 1910.
977,006.
Patented Nov. 29, 1910.
2 SHEETS—SHEET 1.
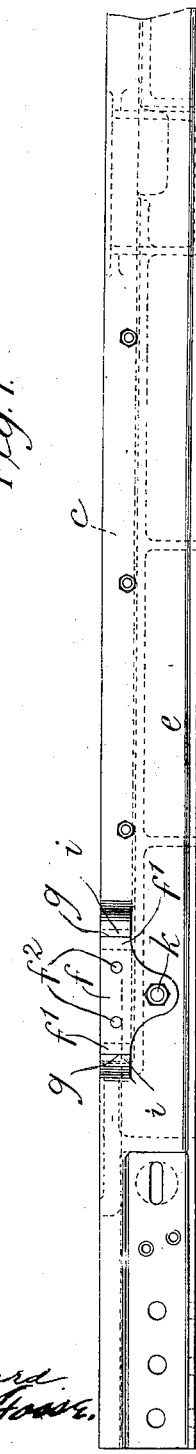
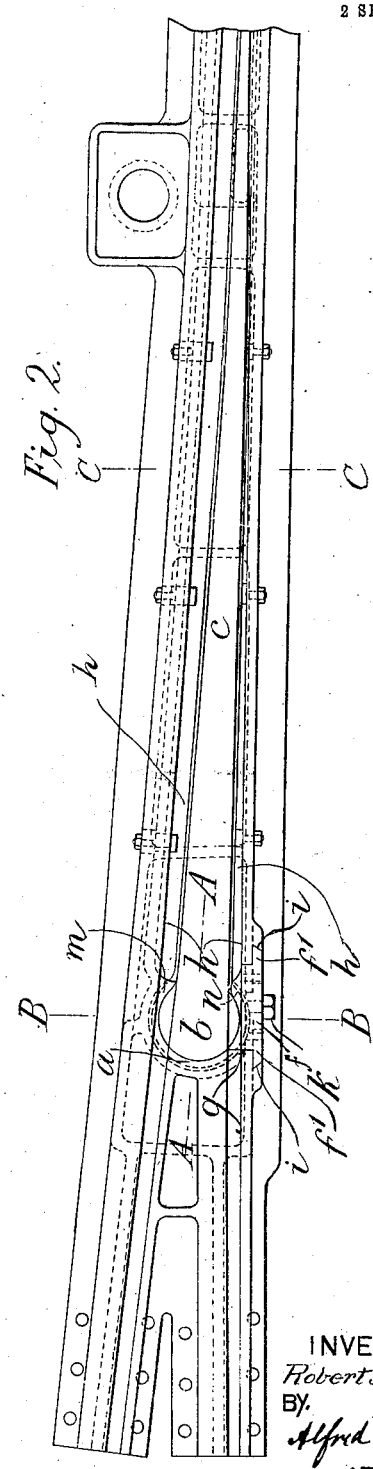
WITNESSES
INVENTOR
Robert A. Hadfield.
BY
Alfred Wilkinson
ATTORNEY.

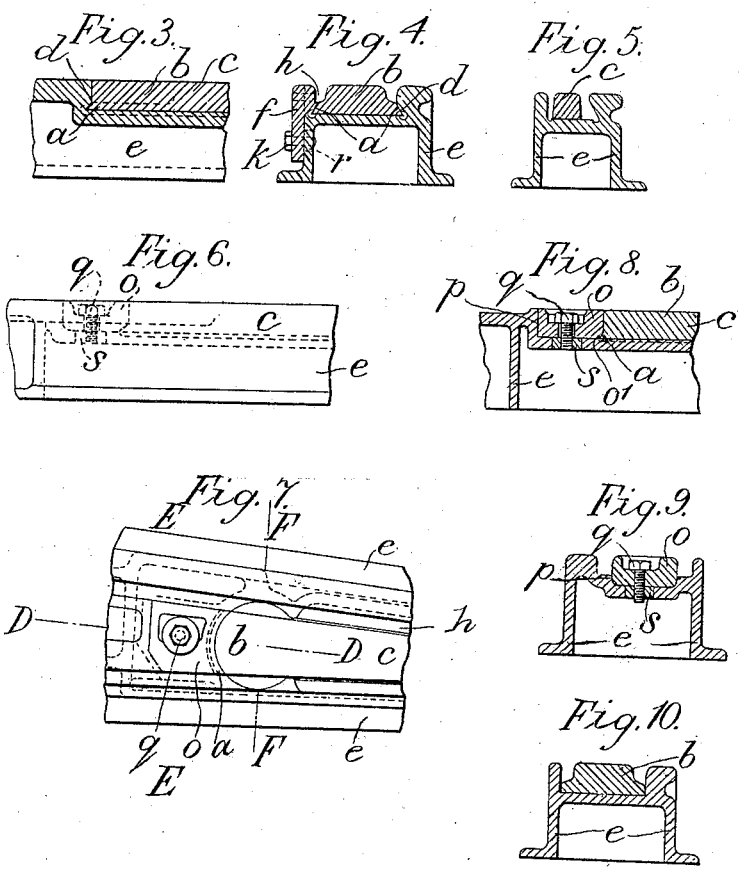

UNITED STATES PATENT OFFICE.

ROBERT ABBOTT HADFIELD, OF SHEFFIELD, ENGLAND.

TRAMWAY-POINT.

977,006.

Specification of Letters Patent. Patented Nov. 29, 1910.

Application filed March 21, 1910. Serial No. 550,694.

*To all whom it may concern:*

Be it known that I, ROBERT ABBOTT HADFIELD, knight, a subject of the King of Great Britain and Ireland, residing at Sheffield, in the county of York, England, have invented Improvements in Tramway-Points, of which the following is a specification.

This invention has reference to tramway points of the kind comprising a stationary metal casting or body formed with a hollow or recess in which a metal tongue is mounted so as to be capable of limited radial motion in order that its free thin end can be moved into one or the other of two lateral positions as required for controlling the direction in which vehicles shall travel when passing over the point, and particularly to that kind of tramway point in which the enlarged rounded end of the tongue is arranged to bear directly over its whole lower surface upon the bottom of the hollow with a hard metal to metal contact and is held in a bearing in such a manner that while it is free to turn to a limited extent it cannot rise or move forward.

The present invention has for object to enable the enlarged rounded end of the tongue to be firmly retained in place, both vertically and longitudinally, without for this purpose having to form, as heretofore, a horizontal opening through the tongue and the point body for the reception of a cotter or like holding device, so that the tongue can, when required, be made of less depth than has heretofore been necessary to admit of the formation of the horizontal opening therethrough. For this purpose, according to the present invention the enlarged rounded end of the tongue is formed at its lower portion with an outwardly extending flange or projection, or with two or more segmental outwardly extending flanges or projections, adapted to work in a corresponding groove formed in the point body which is shaped to fit the enlarged rounded end of the tongue above the flange or projection or flanges or projections so as to allow of the tongue freely turning in the bearing but not of moving in a vertical or in a forward direction therein, and to admit of the enlarged end of the tongue being readily inserted in place, a part of the point body forming the said bearing is made removable and capable of being readily replaced and fixed in position. A point body with bearing such as described can be constructed in various forms.

In the accompanying illustrative drawings, Figures 1 and 2 show respectively in elevation and plan, one construction of tramway point embodying the invention. Figs. 3, 4 and 5 are sections corresponding to the lines A A, B B and C C respectively of Fig. 2. Figs. 6 and 7 show respectively in side elevation and plan, part of a modified construction of tramway point embodying the invention. Figs. 8, 9 and 10 are sections corresponding respectively to the lines D D, E E and F F of Fig. 7.

In the construction of tramway point shown in Figs. 1 to 5 inclusive, $a$ is an outwardly extending flange or projection formed at the lower portion of the enlarged rounded end $b$ of the tongue $c$ and arranged to work in a corresponding groove $d$ formed in the point body $e$ which is shaped to fit the end $b$ of the tongue above the flange or projection $a$ so as to allow of the tongue freely turning in the bearing thus formed but not of moving vertically. $f$ is a part of the point body constituting the removable portion of the bearing. It is formed by a vertically movable block that is adapted to fit an opening $g$ in the point body $e$ at one side of the hollow $h$ at the bearing end thereof and is formed with flanges or projections $f^1$ adapted to fit oppositely arranged dovetail shaped recesses $i$ in the side of the point body so that when the block is slid vertically into position, it will be rigidly held in a lateral direction. The recesses $i$ may be of any other suitable shape. Vertical movement of the block $f$ may afterward be prevented, as for example by a screw bolt, or, as shown, by a set screw $k$, extending through the lower portion of the block and engaging the lower side portion of the point body $e$ below the bearing. The point body is formed or provided at the bearing end of the hollow $h$ with inwardly extending projections $m$ and $n$, having rounded surfaces, adapted to form the forward portion of the bearing to hold the tongue $c$ in position longitudinally. One of these bearing pieces, namely $m$, may, as shown, be cast in one with the point body $e$ and the other $n$, be formed on the movable block $f$. $f^2$ are holes in the block $f$ to permit of the block being readily raised by a suitably shaped lifting appliance.

In the modified construction shown in Figs. 6 to 10 inclusive, the part of the point body $e$ at the rear end of the hollow $h$ is made in the form of a separate vertically movable block $o$ that can be dropped into an appropriate recess $p$ therefor in the point body and is adapted to form the rear end of the bearing for the enlarged end $b$ of the tongue $c$ and is also formed with a chamfered or undercut portion $o^1$ for the reception of the outwardly extending flange or projection $a$ on the tongue. Any suitable means may be provided for holding the block $o$ in position. In the example shown, the block $o$ is fixed in place by a single set screw $q$ that passes through the block and engages a threaded part of the point body, its head being located in a recess in the upper side of the block.

Opposite lateral portions of the rounded end of the tongue may, in some cases, as in the last described arrangement, be unprovided with an outwardly extending flange or projection, so as to facilitate the insertion of such end of the tongue in the bearing.

The point body $e$ and tongue $c$ may conveniently be of hard steel, such as manganese steel, and the tongue be directly supported, as shown, throughout its length by the metal at the bottom of the hollow which may be ground to form a flat level surface for the underside of the tongue which may also be ground flat. Or the tongue $c$ may in some cases be supported by a faced plate of hard metal, for example carbon steel, that bears directly upon the bottom of the hollow, it may be at various points thereof, and is firmly fixed in place thereon. When the point body is of hard steel, such as manganese steel, the parts $r$ and $s$ thereof into which the set screws $k$ and $q$ respectively take, may, as in the arrangement shown, be formed of softer metal fixed in place in the point body during the casting thereof.

The invention can be applied to spring movable points, automatic pulling points or automatic pushing points.

What I claim is:—

1. A tramway point comprising a tongue having an enlarged rounded end provided with an outwardly extending projection, and a point body adapted to receive said tongue and having a part thereof shaped to form a bearing for the rounded end of said tongue and allow of the tongue freely turning in the bearing but not of moving in a vertical or endwise direction, part of the point body forming the bearing being made vertically movable.

2. A tramway point comprising a tongue having an enlarged rounded end provided with an outwardly extending projection, and a point body adapted to receive said tongue and having a part thereof shaped to form a bearing for the rounded end of said tongue and allow of the tongue freely turning in the bearing but not of moving in a vertical or endwise direction, part of the point body forming the bearing being made with an opening to admit of the enlarged rounded end of the tongue being placed in said bearing, and a removable block adapted to close said opening.

3. A tramway point comprising a tongue having an enlarged rounded end provided with an outwardly extending projection, and a point body adapted to receive said tongue and having a part thereof shaped to form a bearing for the rounded end of said tongue and allow of the tongue freely turning in the bearing but not of moving in a vertical or endwise direction, part of the point body forming the bearing being made with a lateral opening and with vertical guides, and a removable block adapted to be inserted in said guides and close said opening.

4. A tramway point comprising a tongue having an enlarged rounded end provided with an outwardly extending projection, a point body formed with a part bearing adapted to receive the enlarged rounded end of the tongue and prevent longitudinal movement thereof and with a recess in which said projection can work, and a removable block adapted to complete the bearing and normally close an opening in the bearing through which the enlarged end of the tongue can pass.

5. A tramway point comprising a tongue having an enlarged rounded end provided with an outwardly extending projection, a point body formed with a part bearing adapted to receive the enlarged rounded end of the tongue and prevent longitudinal movement thereof and with a recess in which said projection can work, a removable block adapted to complete the bearing and normally close an opening in the bearing through which the enlarged end of the tongue can pass and means for securing said block to the point body.

6. A tramway point comprising a tongue having an enlarged rounded end with an outwardly extending flange thereon, a point body formed with a part bearing for such enlarged rounded end and with a recessed part to receive said flange, said bearing being shaped to prevent longitudinal movement of the tongue, a vertically movable block adapted to complete the bearing, positioning means resisting lateral movement of the block relatively to the point body, and means for preventing the block rising relatively to the point body.

7. A tramway point comprising a tongue having an enlarged rounded end provided with an outwardly extending flange, a point body formed with an opening at one side, vertical guides adjacent to said opening, a part bearing in the point body adapted to prevent longitudinal movement of said tongue and having a recess corresponding to part of the flange on the rounded end of the tongue, a block inserted in the said guides to close the opening in the point body and formed with a recessed bearing part corresponding to the remainder of the flange aforesaid, and means for preventing upward movement of the block.

8. A tramway point comprising a tongue having an outwardly extending part circular flange, greater than a semi-circle, a point body formed with a hollow in which the tongue is arranged and having an opening at one side adjacent to the flange aforesaid, vertical guides adjacent to the said opening, a part bearing formed in the point body opposite the opening and having an undercut recess adapted to receive a portion of the flange, a block inserted in the said guides to close the opening in the point body and formed with an undercut recess adapted to receive the remaining portion of the flange of the tongue, and means for preventing unintentional upward movement of the block.

9. A tramway point comprising a tongue having an enlarged rounded end provided at its lower part with an outwardly extending projection, a point body formed with a hollow to receive said tongue and at one end of said hollow with a part circular bearing greater than a semi-circle, to receive said rounded end of the tongue, with an undercut recess to receive the projection on the rounded end of said tongue, with a lateral opening at one side of said bearing and with vertical grooves at opposite sides of said opening, a removable block inserted in said guides and closing said opening, and means for securing said block in place.

Signed at Colombo Ceylon this nineteenth day of February 1910.

ROBERT ABBOTT HADFIELD.

Witnesses:
D. RUSSELL WATSON,
H. E. WALTER.